United States Patent [19]
Fridman et al.

[11] 3,944,676
[45] Mar. 16, 1976

[54] PROCESS FOR THE MANUFACTURE OF SOYBEAN PROTEIN PRODUCTS

[75] Inventors: Eliahu Fridman; Amior Dolev, both of Haifa, Israel

[73] Assignee: Centre for Industrial Research (CIR) Ltd, Haifa, Israel

[22] Filed: June 28, 1973

[21] Appl. No.: 374,811

[30] Foreign Application Priority Data
July 10, 1972  Israel..................................... 39876

[52] U.S. Cl. ................ 426/46; 426/582; 426/646; 426/656
[51] Int. Cl.² .......................... A23J 1/14; A23J 3/00
[58] Field of Search ............... 426/7, 38, 40, 42, 44, 426/43, 46, 51, 52, 105, 125, 212, 224, 21, 188, 205, 656, 36, 49

[56] References Cited
UNITED STATES PATENTS

| | | | |
|---|---|---|---|
| 2,479,040 | 4/1945 | Davidson | 260/123.5 |
| 2,802,737 | 8/1957 | Anson et al. | 426/212 |
| 2,919,192 | 12/1959 | Hirsch et al. | 426/44 |
| 3,096,177 | 7/1963 | Ariyama | 426/46 |

*Primary Examiner*—A. Louis Monacell
*Assistant Examiner*—R. A. Yoncoskie
*Attorney, Agent, or Firm*—Levonna Herzog

[57] ABSTRACT

A process for the manufacture of soybean products from soybean meals is described. The process comprises in combination the steps of (1) leaching the soybean meal by an aqueous solution and separating the solid residue from the extract; (2) adjusting the pH of the soybean extract to a range of 6.5–7.0; (3) sterilizing the thus-obtained soybean milk; (4) fermenting the soybean milk with a lactic culture selected from *Streptococcus thermophilus, Lactobacillus arabinosus, Lactobacillus casei* and mixtures thereof and (5) separating the resultant soybean curd. The process also describes the use of the soy protein curd as an additive to foodstuff products.

13 Claims, No Drawings

PROCESS FOR THE MANUFACTURE OF SOYBEAN PROTEIN PRODUCTS

The present invention relates to a new process for the manufacture of soybean cured from soybean meal and to soybean products obtained from said curd. The soybean meal preferably used for the present invention is the so called uncalcined meal obtained by heating the soybean meal during the desolventizing below 70°C.

Today it is a generally recognized fact that soybean has become a major factor as a protein source, since it is one of the best and cheapest sources of protein per unit cost of production. The greatest obstacle to the use of soybean as a source of human food product is the bitter, beany taste and objectionable odor and color of such products. Thus, for example, the conventionally marketed soybean milk has an unattractive appearance and is vastly different in flavor from cow's milk and is often found unpalatable by those accustomed to cow's milk.

The main forms of soy protein products, are soy flour and grits, such as defatted soybean flour, soy concentrates and soy isolates. The full-fat soybean flour and soy concentrates are indeed relatively low-cost protein and calorie-rich food ingredients, which can be made in simple processing units, but they suffer from a beany taste. The soy isolates, which are defined in commerce as the major proteinaceous fraction of soybeans prepared from high quality dehulled beans, have indeed a better taste than the soybean flour, but are much more expensive.

The separation of the protein fraction of the soybean is practised today in the Far-East to produce soy-bean curd and Chinese cheese or so called tofu. Recently a new direction in the preparation of soy-bean cheese starting from raw soybeans under controlled conditions using a lactic starter organism has been reported. According to this method, the raw soybeans are washed and the resulting solution is cooked under pressure thus resulting in a soybean milk. The soybean milk has been converted into soybean curd by three different methods: (1) addition of $CaSO_4$, (2) addition of acetic acid and (3) addition of lactic acid fermentation reagent. The yield of total reprecipitated protein obtained by adding acetic acid is about 68%, compared with 54–55% obtained by either the addition of calcium sulphate or by lactic acid fermentation reagent. The drawback of the method using a lactic acid fermentation reagent is the long period of time required for the coagulation of the curd and separation of the whey. The long period of coagulation increases the chances of contamination by undesirable microorganisms normally present in the soy milk, resulting from the raw soybeans or present in the environment. Also some improvements with respect to the palatability and physical and microbiological aspects of the curd obtained are still required. For this reason the addition of rennet extract and skim milk were tried by the same investigators. Indeed by incorporation of rennet extract and skim milk the overall time for the manufacture of the curd was lowered by 40 minutes; also this incorporation improved the flavor and taste of the final product. However, this method still suffers from the fact that the overall yield of the protein precipitation was only 55%. From a commercial and an economic point of view, it is desirable to recover substantially all of the protein from the soybean source material, but this led to harsh isolation procedures. These harsh isolation procedures extract not only protein, but also malodorous flavoring matter, pigmentary matter, mucilaginous matter etc. Furthermore the incorporation of the rennet extract and skim milk results in an enzymatic decomposition of casein, as well as of the soybean protein.

It is an object of the present invention to provide a new process for the manufacture of soybean curd, starting from soybean meal and its transformation into various soybean products.

It is another object of the present invention to obtain debittered soybean curd with improved palatable properties which can be processed into various soybean foodstuffs.

It is still another object of the present invention to obtain a soybean curd having a high content of protein.

These and other objects of the invention which may appear as this specification proceeds are achieved by this invention.

The invention, therefore consists in a process for the manufacture of soybean products from soybean meal which comprises in combination the steps of: (a) leaching the soybean meal by an aqueous solution and separating the solid residue; (b) pH adjustment of the soybean extract to a value between 6.5–7.0 to give a soybean milk; (c) sterilization of the soybean milk; (d) fermentation by a lactic culture; (e) separation of the soybean curd and (f) transformation of said curd into edible soybean products.

The soybean products obtained are characterized by improved body and flavor and have, in general, much better palatability properties than soybean products obtained from the curd obtained from soybeans by conventional methods.

Generally any type of soybean meal may be used. In particular uncalcined soybean meals, which are commonly defined as soybean meals desolventized below 70°C, give the best results of yield recovery of the protein constituent.

The step (a) is preferably effected by means of a slightly alkaline earth metal hydroxide solution, but other neutral aqueous solutions or other alkaline substances or mixtures thereof may be used e.g. plain water, sodium hydroxide, calcium hydroxide, ammonium hydroxide etc. The efficiency of the leaching depends on the temperature, leaching time, ratio of the solution to the soybean meal and the concentration of the solution. Thus with a 0.01 M solution of $Ca(OH)_2$ at a temperature of 55°C, a leaching time of 30 minutes is required. Also when calcium hydroxide is used, a much better yield of milk recovery from soybean meal is achieved than using a neutral aqueous solution. In addition to that, the presence of calcium ion is an advantage taking into account that a principal objection of the use of soybean milk as a substitute for cow's milk is its exceedingly low calcium content, less than one fourth of the calcium content of cow's milk. On the other hand, when a high concentration of $Ca(OH)_2$ is present in the aqueous solution used in leaching, a hard curd is obtained; also the relative high concentration of calcium ions decreases the solubility of the curd. Preferred concentrations to be used are in the range of 0.003M–0.02M of $Ca(OH)_2$, or 0.01M of NaOH and preferred temperatures are in the range of 50°–60°C.

As an optional operation one or more additional leaching operations with fresh alkaline hydroxide or plain water may be performed on the wet residue obtained after decantation of the soybean extract. However large amounts of solvent will dilute the final soymilk and will cause some difficulties in the further steps of the process.

The separation of the soybean extract from the residue can be done by filtration under vacuum, filter-press or centrifugation. The preferred method found, is a combination of filter-press and centrifugation in which case more than 90% of the volume of the extract is obtained.

The pH adjustment is an important critical step required for the process. The decrease in pH to 6.5 enable a rapid growth of the bacteria in the further step, but a pH below 6.5 will cause precipitation of protein during the sterilization step. Thus a compromise between the growth of bacteria and the avoidance of protein precipitation has to be chosen. It was found that the pH of the solutions has to be between 6.5 and 7.0 and preferably between 6.6 and 6.8.

The pH adjustment can be done by an edible acid such as critic acid, hydrochloric acid, etc. The concentration of the acid used is not critical but should not be so high as to be capable of causing damage to soymilk, but on the other hand, as small a volume of aqueous acid is as possible to be handled is preferred. The preferred concentration of the acid is between 0.3N – 1N.

The sterilization step is absolutely required. Since the soymilk is rich in protein, sugars and salts, it is an adequate media for the growth of microorganisms which normally are present in soybeans. The heat treatment sterilizes the soy milk and destroys the antidigestive factors present in the soybeans; at the same time this heat treatment removes, to a certain extent, the beany flavor which the meal contains. It has been found that the sterilization also has a beneficial effect on the coagulation in the subsequent step. The time of sterilization depends on the temperature but overheating should be avoided since it may cause precipitation of the protein. Preferred conditions found for sterilization in an autoclave are 110°C – 120°C for a period of 2–5 minutes.

The fermentation by lactic cultures used as a starter for the coagulation of the curd is an essential feature in the process of this invention. Up until the present time, commercial processes and processes known from the prior art for the precipitation of curd from soymilk addition of salts and heating. The curd obtained has indeed a white color, but has a bitter and beany taste. In accordance to step (d) of the present invention, the precipitation of the curd from the soy milk obtained after sterilization is done by adding a starter selected from a lactic culture. The lactic culture added as starter belongs to the family of lactobacillaceae, of the lactic group. Useful as coagulation agents according to the present invention are the bacteria which fulfill the main requirement of utilization of a sugar present in the soy milk as a source of carbohydrates (succrose and rafinose). Examples of these bacteria are: species of *Streptococcus thermophilus* (at pH 4.5) *Lactobacillus arabinosus* (at pH 4.2), *Lactobacillus casei* (at pH 5.2) etc. A person skilled in the art will easily select the proper bacteria according to the final product desired. The lactic culture lowers the pH of the soymilk to 5.2 –4.2 after 4 – 18 hours at a temperature of 37° – 40°C. This lowering of pH is the result of transformation of carbohydrates present in the soymilk into the corresponding acids. It was unexpectedly found that by the use of the lactic culture alone, the separation of the curd from the soybean whey can be easily carried out by a combination of gravitational filtration and centrifugation. A slight increase in temperature improves the rate of separation.

The curd obtained is very rich in protein; more than 90% of the protein from the soymilk can be precipitated in the curd. This is a very high protein recovery which cannot be obtained by any of the other methods known from the prior art. The inventors had also tried to use in this step the known acid precipitation instead of lactic culture, but only 80% of protein from soymilk were found in the curd under the same conditions of experimentation. Thus the soya curd prepared according to the present invention is characterized by its high nutritional value, particularly in protein and has a better palatability and digestibility than the known soya curd, as found by a trained taste panel.

The entire process is carried out under controlled and relatively very mild conditions of temperature and reaction time so as to effect the desired flavor improvement without protein degradation. Although the reasons for the success of the better palatability are not entirely understood, a reasonable hypothesis based on the available evidence is that the organic materials responsible for the bad flavor are eliminated under the catalytic influence of the enzyme content of the lactic culture to form organic acids having less objectionable organoleptic properties, it seems that at the same time new desirable flavors are formed under the controlled fermentation conditions.

Various products can be manufactured from the high-protein improved curd, obtained according to the present invention. Among these products the following may be mentioned: spreads, meats, sausages, beverages, infant food formulations, whip toppings etc.

In the manufacture of spreads, the curd is homogenized with melting salts (e.g. sodium phosphate): fats and starch may also be added. All the mixture is further mixed with vegetables and spices thus obtaining flavored spread with various aromas. These spreads may be conserved and canned.

In the same manner as described above by performing a heat treatment in an autoclave at a temperature above 120°C for 15 minutes it is possible to obtain a hard product, like hard-cheese, which can be sliced. It is also possible to use the curd as an additive in the manufacture of various meat products such as simulated meats resembling chicken and especially in the production of sausages or frankfurters. The curd from the soybean meal prepared according to the present invention may be used up to 25% by weight of the total ingredients of the sausage, thus enriching the sausage with protein and at the same time lowering the price in view of the relative low cost of the soy protein.

The use of the soy protein in the meat industry has a two-fold purpose: (1) to alter or improve existing meat products and (2) to extend or simulate meats. Any seasoning and flavoring agent may be added to the mass containing the curd so that the finished product can have a beef, chicken, garlic or onion flavor. From the curd obtained according to the present invention, it is possible to prepare by conventional methods special soy proteins which have emulsification and binding properties that contribute to the texture of the finished meat products.

Edible outer additives which may be used advantageously include starches, flours, gums, fats, proteinaceous materials such as oilseed protein, gelatin, cracker meal, bread crumbs, and oilseed meal. Coloring materials and fortifying nutrients such as vitamins may also be added. By additions of various flavoring materials and spices it is possible to obtain various snacks in the form of balls (granules).

It is also possible to apply a proteolytic enzymatic digestion of the curd, either by the addition of an enzyme reagent (such as pepsin, molsin) or by external proteolysis with the aid of a suitable microorganism such as Actinomucor elegans, or Aspergillus sojae.

Generally the curd can be used as an additive for any food-stuff which requires a source of protein, as commonly used in the food industry.

In order to illustrate further the nature of this invention and the manner of practicing the same more fully, the following examples are presented for clearness of understanding therefrom, without being limited thereto, for modifications will be obvious to those skilled in the art.

EXAMPLE 1

Preparation of curd.

1000 grams of soybean meal containing 42% total protein obtained from uncalcined soybeans (soybean-meal desolventized below 70°C) were leached for 30 minutes with 10 liters of an aqueous solution of 0.01 M $Ca(OH)_2$ at 55°C. During the leaching a continuous mixing was provided. The residue was separated by gravitation and finally passed through a screw press. The filtrate was centrifuged through a basket centrifuge. The filtrate is further adjusted to the pH of 6.7 by adding slowly under continuous stirring, an amount of 100 ml of HCl 0.5 N. The soybean milk obtained had a white milky color; it was introduced into 4 bottles and sterilized in an autoclave at 116° for 4 minutes. After that the milk was quickly cooled at 40°C.

The content of the bottles was introduced into an open vessel and inoculated with 225 ml of a freshly prepared culture of *Streptococcus thermophilus* as lactic starter. The mixture was introduced in an incubator for 5 hours at 40°C. A complete coagulation occured, the gel formed was cut into small cubic pieces and the curd was separated by filtration on cheese cloth. The curd obtained contained 18% solids which have 78% protein. The overall yield of protein recovery from the total protein present in the meal was 65%.

EXAMPLE 2

Preparation of curd 5000 grams of the same uncalcined soybeans used in Example 1 were leached with 35 liters of tap water for 60 minutes at 55°C. During the leaching a continuous stirring was provided. The experiment was continued as in the previous Example. The soybean milk obtained was introduced in 12 bottles, and sterilized into an autoclave at 116°C for 4 minutes. The inocculation was performed with 750 ml of a freshly prepared culture of *Streptococcus thermophilus*. The procedure was the same as in the previous example and a similar product was obtained, but the overall yield of the protein recovery was only 30%.

EXAMPLE 3

Preparation of curd

The same experiment as in Example 1 was repeated using 1000 grams of the same uncalcined soybeans but the leaching was performed with 10 liters of a solution of 0.02 N NaOH. The same procedure was continued as in Example 1 the only difference being the pH adjustment, which was done with 100 ml of citric acid, 0.5 N. The same lactic culture was used. A similar product to that obtained in Example 1 resulted but the overall yield of the protein recovery in this case was 70 %.

EXAMPLE 4

Preparation of curd

The same experiment as in Example 1 was repeated, the difference being the lactic starter used, which in this case was 225 ml of *Lactobacillus arabinosus*, and incubated for 16 hours at 40°C. (getting a pH of 4.2).

A similar product to that obtained in Example 1 was obtained, the overall yield being also 65% from the total protein present in the meal.

EXAMPLE 5

Preparation of curd

The same experiment as in Example 1 was repeated the difference being the lactic culture which in this experiment consists of a mixture of 100 mls of a freshly prepared culture of *Streptococcus thermophilus* + 125 mls of *Lactobacillus arabinosus*. The incubation was carried out for a period of 7 hours at 40°C. The overall yield of protein recovery from the total protein present in the meal was 68%.

EXAMPLE 6

Preparation of soybean spread

To 670 grams of the curd (18% solids) prepared according to Example 1, an amount of 330 ml of plain water were added. The slurry was blended and mixed with 20 grams of $Na_2HPO_4$ and homogenized again. To the mixture obtained, 75 ml of sunflower oil, 37.5 grams of cornstarch and 20 grams of NaCl were added. All the ingredients were again homogenized in obtaining a spread with an improved butter-like texture.

To obtain a spread with different flavor or spices: dehydrated onion (4%), garlic flavor, concentrated tomatoes paste, synthetic roquefort flavor (0.6), monosodium glutamate with garlic flavor or/and smoked flavor were added. The spreads were filled into cans, closed and heated to about 90°C for 15 minutes.

EXAMPLE 7

Preparation of hard cheese-like product

This product was prepared like in the previous example, but the cans were heated to 120°C for 15 minutes.

EXAMPLE 8

Preparation of sausage 500 grams of the curd obtained in Example 1 (18% solids) were added to 1000 grams of the sausage composition, and milled by extrusion. To the mixture obtained the following spices were added: 4.5 grams of salt, 1.5 grams of pepper, 0.15 grams of garlic 0.11 grams of marjoram and 0.3 grams of sodium glutamate; the total mass was homogenized again and treated as known in the sausage industry.

As is known to those of skill in the art, soybean meal desolventized below 70°C means the meal obtained by removing the solvent from the dehulled meal while the temperature is kept below 70°C.

We claim:

1. A process for the manufacture of soybean products from soybean meal which comprises in combination the steps of: (a) leaching the soybean meal with an aqueous solution and separating the solid residue to obtain a soybean extract; (b) adjusting the pH of the soybean extract to a value between 6.5 – 7.0 to give a soybean milk; (c) sterilizing the soybean milk in order to destroy the antidigestive factors present in said soybean meal and to reduce the beany flavor of said meal; (d) fermenting said thus-obtained soybean milk after said sterilization with a lactic culture under conditions suitable to utilize natural sugar present in said soybean milk as a source of carbohydrates in order to produce a soybean curd; (e) separating the soybean curd and (f) transforming said curd into soybean products.

2. A process for the manufacture of soybean products as in claim 1 in which the meal used resulted from the desolventized soybeans meal heated below 70°C.

3. A process for the manufacture of soybean products as in claim 1 in which the leaching of the soybeans meal is carried out by an aqueous solution, wherein the alkaline substance is selected from $Ca(OH)_2$, NaOH and mixtures thereof.

4. A process for the manufacture of soybean products according to claim 3, in which the $Ca(OH)_2$ solution has a concentration in the range of 0.003–0.02 M.

5. A process for the manufacture of soybean products according to claim 1 in which a pH adjustment in the range of 6.6 – 6.8 is carried out on the soybean extract.

6. A process for the manufacture of soybean products according to claim 5, in which the pH adjustment is done by an edible acid selected from hydrochloric acid an citric acid.

7. A process for the manufacture of soybean products according to claim 1 in which a fermentation is done by a lactic culture selected from Streptococcus thermophilus, Lactobacillus arabinosus, Lactobacillus casei and mixtures thereof.

8. A process for the manufacture of soy protein based spreads obtained by incorporation of soya curd produced according to claim 1.

9. A process for the manufacture of soy protein based hard cheese-like product obtained by incorporation of soya curd produced according to claim 1.

10. A process for the manufacture of soy protein based sausage product obtained by incorporation of soya curd produced according to claim 1.

11. A process according to claim 1 in which the sterilization of said soybean milk is carried out by heating at a temperature of about 110°– 120°C.

12. A process in accordance with claim 1 in which the pH of said soybean milk after fermentation with said lactic culture is about 5.2 to 4.2.

13. A process in accordance with claim 1 in which said soybean meal is leached with an aqueous $Ca(OH)_2$ solution having a concentration of about 0.003 to 0.02M, said soybean milk is sterilized at a temperature of about 110°–120°C and the pH of said soybean milk after fermentation with said lactic culture is about 5.2 to 4.2.

* * * * *